United States Patent
Scouller et al.

(10) Patent No.: US 9,110,782 B2
(45) Date of Patent: Aug. 18, 2015

(54) EMULATED ELECTRICALLY ERASABLE MEMORY PARALLEL RECORD MANAGEMENT

(75) Inventors: Ross S. Scouller, Austin, TX (US);
Daniel L. Andre, Austin, TX (US);
Jeffrey C. Cunningham, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 639 days.

(21) Appl. No.: 13/457,669

(22) Filed: Apr. 27, 2012

(65) Prior Publication Data

US 2013/0290603 A1 Oct. 31, 2013

(51) Int. Cl.
*G06F 12/00* (2006.01)
*G06F 12/02* (2006.01)

(52) U.S. Cl.
CPC .... *G06F 12/0246* (2013.01); *G06F 2212/1024* (2013.01); *G06F 2212/151* (2013.01); *G06F 2212/7202* (2013.01); *G06F 2212/7203* (2013.01); *G06F 2212/7204* (2013.01)

(58) Field of Classification Search
CPC ............... G06F 12/0246; G06F 2212/151
USPC ........................................ 711/103
See application file for complete search history.

(56) References Cited

U.S. PATENT DOCUMENTS

| | | | |
|---|---|---|---|
| 5,784,611 A | 7/1998 | Thantrakul | |
| 6,904,400 B1 | 6/2005 | Peri et al. | |
| 7,058,755 B2 | 6/2006 | Nallapa | |
| 7,600,090 B2 | 10/2009 | Cohen et al. | |
| 8,041,880 B2 | 10/2011 | Terauchi | |
| 2007/0143528 A1 | 6/2007 | Przybylek | |
| 2008/0065825 A1* | 3/2008 | Fang et al. | 711/112 |
| 2009/0106487 A1 | 4/2009 | Kruecken | |
| 2010/0011155 A1 | 1/2010 | Kitagawa | |
| 2010/0250875 A1 | 9/2010 | Leung et al. | |
| 2011/0078362 A1 | 3/2011 | Scouller et al. | |
| 2011/0107009 A1 | 5/2011 | Scouller et al. | |
| 2011/0173373 A1 | 7/2011 | Scouller et al. | |
| 2011/0271034 A1 | 11/2011 | Scouller et al. | |
| 2011/0271035 A1 | 11/2011 | Scouller et al. | |
| 2012/0005403 A1 | 1/2012 | Scouller et al. | |

* cited by examiner

*Primary Examiner* — Aracelis Ruiz

(57) ABSTRACT

A method of transferring data from a non-volatile memory (NVM) having a plurality of blocks of an emulated electrically erasable (EEE) memory to a random access memory (RAM) of the EEE includes accessing a plurality of records, a record from each block. A determination is made if any of the data signals of the first data signals are valid and thereby considered valid data signals. If there is only one or none that are valid, the valid data, if any is loaded into RAM and the process continues with subsequent simultaneous accesses. If more than one is valid, then the processes is halted until the RAM is loaded with the valid data, then the method continues with subsequent simultaneous accesses of records.

20 Claims, 5 Drawing Sheets

EMULATED ELECTRICALLY ERASABLE MEMORY PARALLEL RECORD MANAGEMENT

BACKGROUND

1. Field

This disclosure relates generally to memory systems, and more specifically, to method of operating an emulated electrically erasable (EEE) memory.

2. Related Art

Emulated electrically erasable (EEE) memories typically use a random access memory combined with a non-volatile memory that is electrically erasable to provide a memory system that has increased endurance over a regular non-volatile memory for a comparable size to that of the random access memory. This is achieved using a non-volatile memory much larger than the random access memory but EEE memory operates as if it were only the size of the random access memory. Thus the EEE memory emulates an electrically erasable memory of a reduced size from that which is used by the EEE memory but with an increase in endurance. This is useful in situations in which endurance is very important such as automotive applications in which data is updated often and must be stored in a non-volatile manner. This also useful by having smaller erasable units.

One problem common to EEE memories is that there can occasionally be long delays in being able to write data into the non-volatile memory because data is written to and read from blocks sequentially. Currently EEE is split into multiple systems, which are associated within a specific memory block. This helps limit the complexity of systems rolling over from one block to the other. Though this helps produce more manageable systems, the basic architecture forces sequential access of all records. Any attempt to reduce search times by creating more EEE systems requires more RAM storage to track the unique feature of each system.

Accordingly, there is a need to provide an EEE memory that improves upon the issue described above.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of systems and methods are disclosed herein that include emulated electrically erasable (EEE) memory with a RAM and multiple blocks of NVM divided into sectors. The sectors are further divided into records. Sectors in each block can be accessed simultaneously and in parallel to speed up write (copy down) and search times. Multiple sectors can also be erased in parallel.

Figure 1:
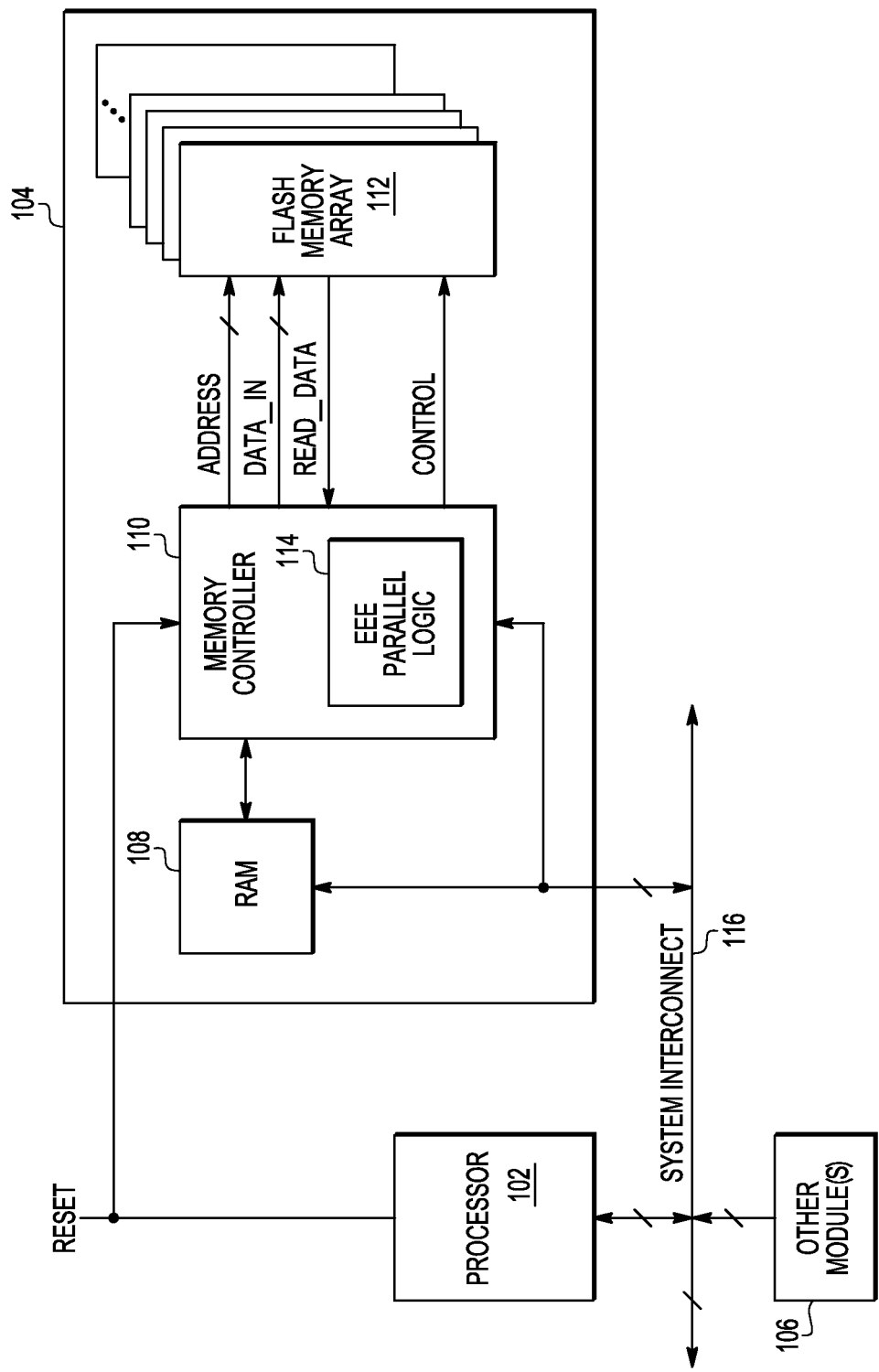
FIG. 1 illustrates in block diagram form an embodiment of a system, including an emulated electrically erasable memory using a non-volatile memory, useful in implementing embodiments of the present invention.

FIG. 1 illustrates, in block diagram form, a system 100 which includes a processor 102, other module(s) 106 (if any), a system interconnect 116, and an EEE memory system 104 (which may also be referred to as a memory system or a non-volatile memory system). Each of processor 102, other module(s) 106, and EEE memory system 104 are bidirectionally coupled to system interconnect 116. EEE memory system 104 includes a RAM 108, a memory controller 110, EEE parallel logic 114, and a flash memory array 112 (which may also be referred to as an NVM array, where any type of NVM may be used in place of the flash memory). RAM 108, which may be considered a volatile memory, is bidirectionally coupled to system interconnect 116 and to memory controller 110. Memory controller 110 including EEE parallel logic 114 is coupled to sensing circuitry (not shown) and flash memory array 112. Memory controller 110 communicates control signals and provides an address and data in to flash memory array 112 and receives read data from flash memory array 112. A reset signal is provided to processor 102 and memory controller 110. This reset signal may be, for example, a global reset signal for system 100.

Processor 102 can be any type of processor, such as a microprocessor, digital signal processor, etc., or may be any other type of interconnect master which can access EEE memory system 104. In one form, system interconnect 116 is a system bus. Other forms of interconnect may be used including, for example, crossbars, point-to-point connections, and optical and wireless transmission techniques. Other modules 106 may include any type of module, such as, for example, another memory, another processor, another interconnect master, a peripheral, an input/output (I/O) device, etc. Alternatively, no additional modules may be present in system 100.

In operation, processor 102 can send access requests (read or write access requests) to memory system 104. The access requests from processor 102, which include an access address, and, in the case of a write access, associated write data, are provided to RAM 108. The received access address can be provided as ADDRESS to flash memory array 112 and the associated write data as DATA_IN to flash memory array 112. In the case of a read access, RAM 108 provides processor 102 the data stored at the received access address location. In the case of a write access, RAM 108 stores the received write data at the received access address location. In the case of a write access, memory controller 110 may detect an update of RAM 108 and selectively store the received access address and associated write data to a first block in flash memory array 112. Data for the next update would be written to the next block in flash memory array 112, and so on. An amount of data that is larger than a record in a block can be divided up to form two or more records that are written in parallel to flash memory array 112, with each record being written to a different logically sequential block.

In one example, the writing of the record corresponding to the RAM update is only performed if the value that is currently stored at the RAM location is different from the new write value associated with the write access request for that RAM location. In this manner, flash memory array 112 can store the values of RAM 108 which have been updated in a more permanent manner. That is, when RAM 108 loses power, its data is lost. Upon restoring power, the values of the RAM may be restored from flash memory array 112, which does not lose its data upon losing power. In one embodiment, flash memory array 112 has a greater storage capacity than RAM 108. For example, flash memory array 112 may have a capacity of at least four times greater than RAM 108 and typically much larger than that.

Figure 2:
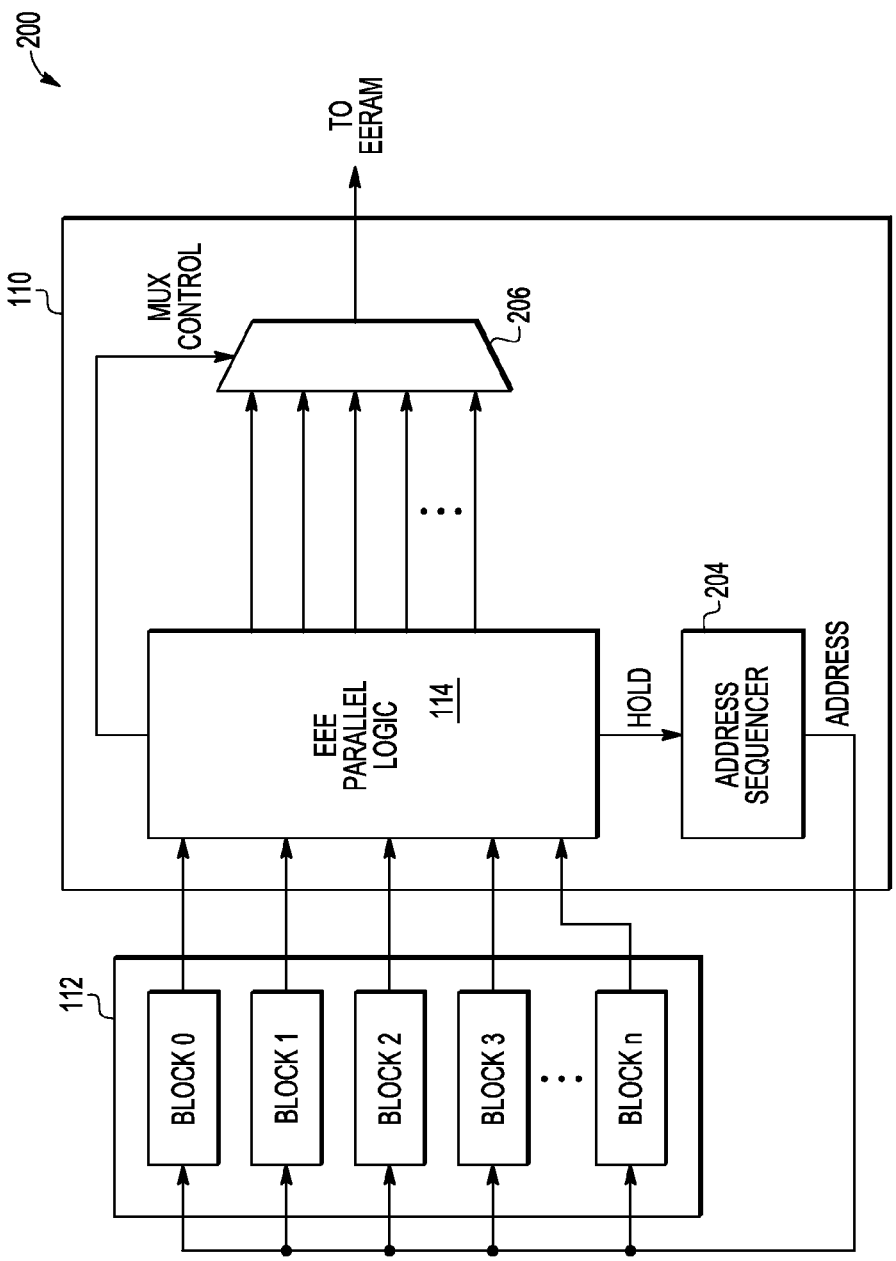
FIG. 2 illustrates in more detail, the flash memory and a portion of the memory controller also of FIG. 1.

FIG. 2 illustrates aspects of flash memory array 112 and a portion of memory controller 110 also of FIG. 1. Note that flash memory array 112 and memory controller 110 can include additional components that are not shown in FIG. 2. Flash memory array 112 includes memory blocks 0 through n that are configured to receive address information from address sequencer 204 and to provide data to EEE parallel logic 114. EEE parallel logic 114 receives data from memory flash memory array 112 and generates a HOLD indicator that is provided to address sequencer 204 to prevent address sequencer 204 from changing the address due to the fact that the same address will be used for each block where a record will be accessed. The HOLD indicator is set when there is more than one valid record of the data to be sent from EEE parallel logic 114 to RAM 108 (FIG. 1) via multiplexer 206. The HOLD indicator is cleared when there is one valid record of data to be sent.

Figure 3:
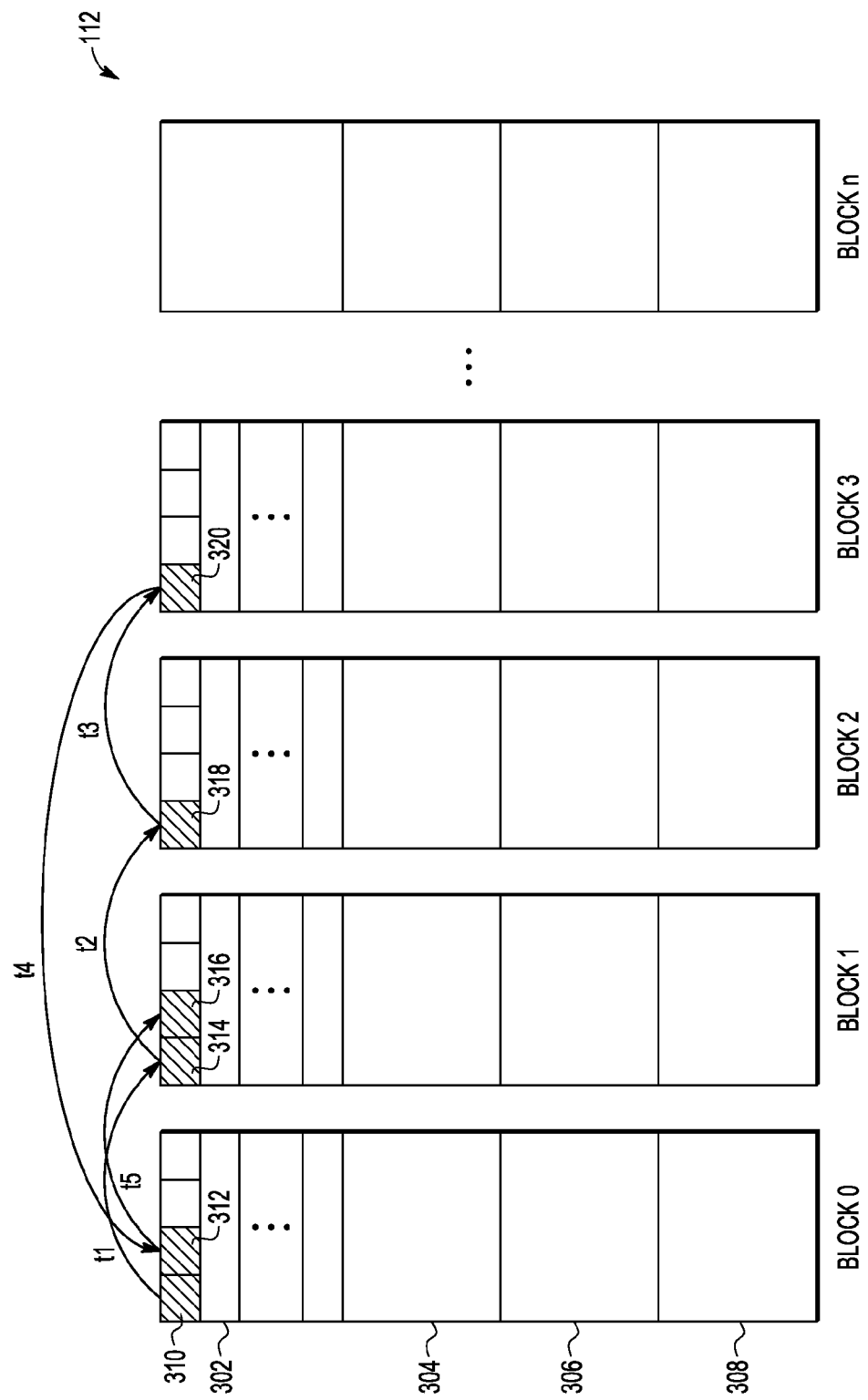
FIG. 3 illustrates in more detail the flash memory of FIG. 2.

EEE parallel logic 114 also generates a mux control signal that is provided to multiplexer 206 to control which data from blocks 1-n is sent to RAM memory 108. Referring to FIGS. 2 and 3, flash memory 112 with blocks 1-n is shown in FIG. 3 with each block 1-n including multiple sectors 302-308. Each sector includes multiple records. In the example shown, sector 302 of block 0 includes records 310, 312; sector 302 of block 1 includes records 314, 316; sector 302 of block 2 includes record 318; and sector 302 of block 3 includes records 320.

Records are added in rotation one block at a time, which means that the same record position in each block will have sequential records. As an example of the way data is written in flash memory 112, at time t0, data in record 310 of block 0 is written. At time t1, the next data is written in record 314 of block 1. At time t2, data is written from sector 318 in block 2. At time t3, data in record 320 is written. At time t4, data is written in sector 312 in block 0, and at time t5, data is written in record 316 of block 1. Subsequent data reads would be made from the same address (sector) in each block in rotation. When more than one record of data is required for a single read, then the records in the required blocks can be accessed in parallel, thus reducing the time required to provide an update to RAM 108 (FIG. 1).

Two different read operations that can be performed with memory system 104 (FIG. 1) are copy down and search. During the read operations, records are read from the same physical location in each block. So data is added to records in each block in that order, rotating between blocks. The oldest data can be accessed first for search and copy down. During a copy down operation, data from flash memory array 12 is transferred to RAM 108. A record will be read for the common physical record address in each block that includes the data. The state of a record can be erased or valid. Only valid records are copied to RAM 108. If more than one valid record is accessed then EEE parallel logic 114 will set the HOLD indicator and each record will be copied in turn to the RAM 108. During a search operation, only a small number of records need to be located and the search stops on any hit. Accordingly, no parallel write access is required, but the order that records are accessed follows the same convention as when the records were created.

As an example of time savings that can be achieved for a copy down operation, for a system with 512 kiloBytes (kB) of four 128 kB blocks used to store 8 byte records (each record maps to one address step), a total of 64 k records would exist. A 4 kB EEE image storing the data in 4 byte chunks would require 1 k records. A standard copy down would take 64 k×⅟25 MegaHertz (MHz)=2.6 milliseconds (ms), however, the example system is capable of reading four records at a time and thus only requires (64 k/4+0.5 k)×⅟25 MHz or 0.675 ms. Further, search and erase times in the example system would only be 25% of the time required in previously known systems due to the fact that search and erase operations can be performed on four blocks in parallel. Note that a greater number of blocks can be used in system 100 (FIG. 1) to further increase the number of operations that can be performed in parallel and decrease the time required to perform the operation.

Figure 4:
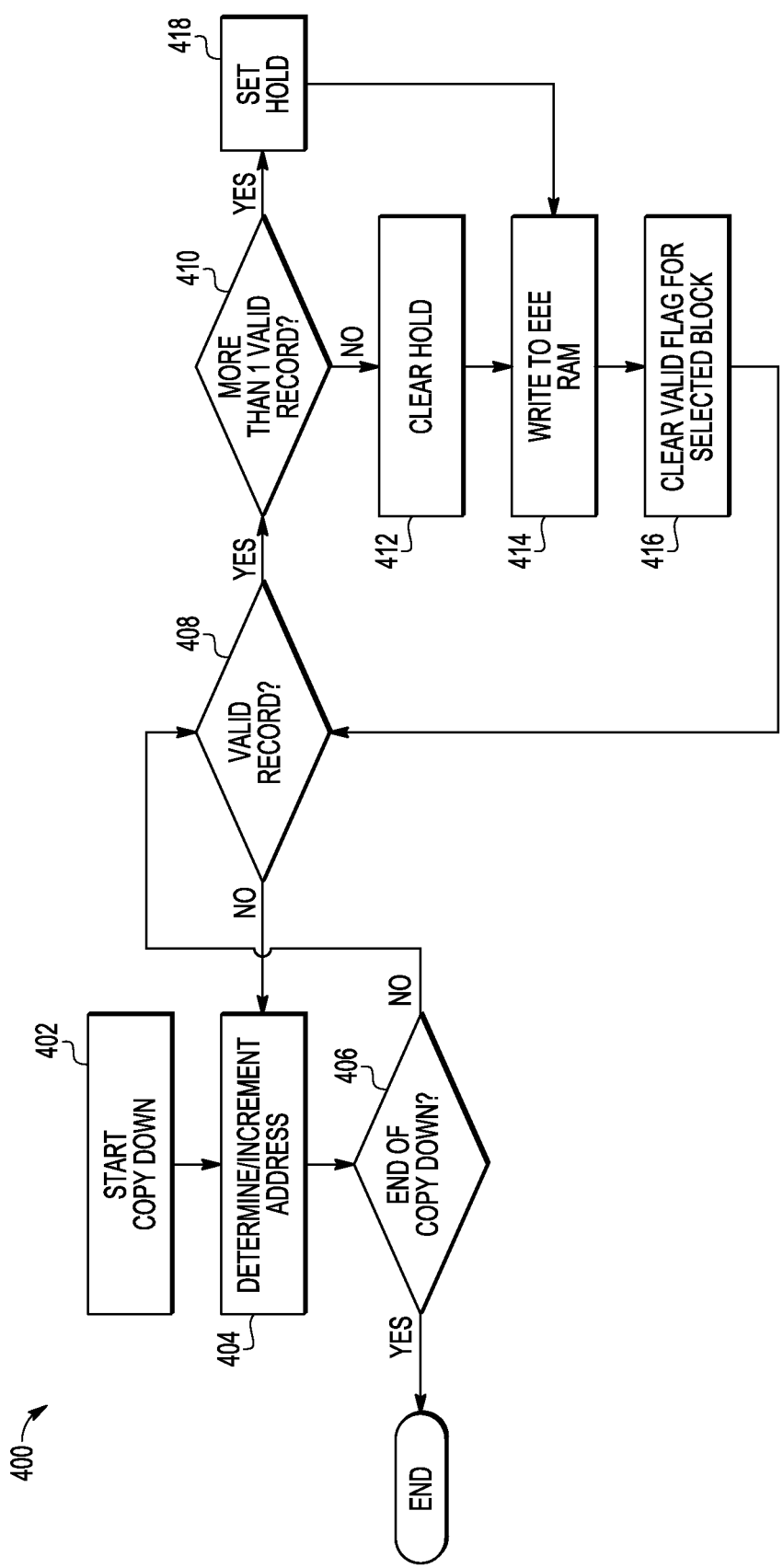
FIG. 4 illustrates a flow diagram of an embodiment of a copy down operation that can be performed in the system of FIG. 1.

FIG. 4 illustrates a flow diagram of an embodiment of a copy down operation 400 that can be performed system 100 of FIG. 1. In process 402, a copy down operation is started during which data signals can be transmitted in parallel from a flash memory array to RAM. Each data signal is representative of data in a record in a block of memory, and each record is in a different block. On an initial pass, process 404 includes determining the address of the record that contains the data to be copied. The address can be the same for each block involved in a particular transfer if data in more than one record is to be transferred.

Process 406 includes determining whether all of the data has been transferred to RAM, i.e., the copy down process is completed. If so, the copy down process ends, otherwise, process 408 checks a valid indicator for the record to determine if the record at the address provided by process 404 contains valid data for a block. If so, process 410 determines if there is more than one record that contains valid data to be used for the data transfer. If more than one record is involved in the data transfer, process 418 sets a HOLD indicator that is provided to the address sequencer to indicate that the address should not be sequenced until the HOLD indicator is cleared. By holding the address at the current address, process 400 can sequence through the blocks in the flash memory array to gather the data from the records at the same address in each block.

Process 418 transitions to process 414 in which the data from the record for a selected block is written to the RAM. Process 416 then clears a valid indicator for the block and transitions back to process 408 to repeat the sequence of processes 410-418 for the next block if a valid record is present at the address for the next block. Note that if process 408 determines a valid record is not present at the address for the next block, process 408 transitions to process 404 to increment the address. Process 404 transitions to process to determine whether the copy down process is complete, as previously described herein.

Referring again to process 410, if there is not more than one record that contains valid data, the process 412 clears the HOLD indicator. Process 412 transitions to process 414 in which the data from the record for a selected block is written to the RAM. Process 416 then clears a valid indicator for the block and transitions back to process 408 to repeat the sequence of processes 410-418 for the next block if a valid record is present at the address for the next block.

Figure 5:
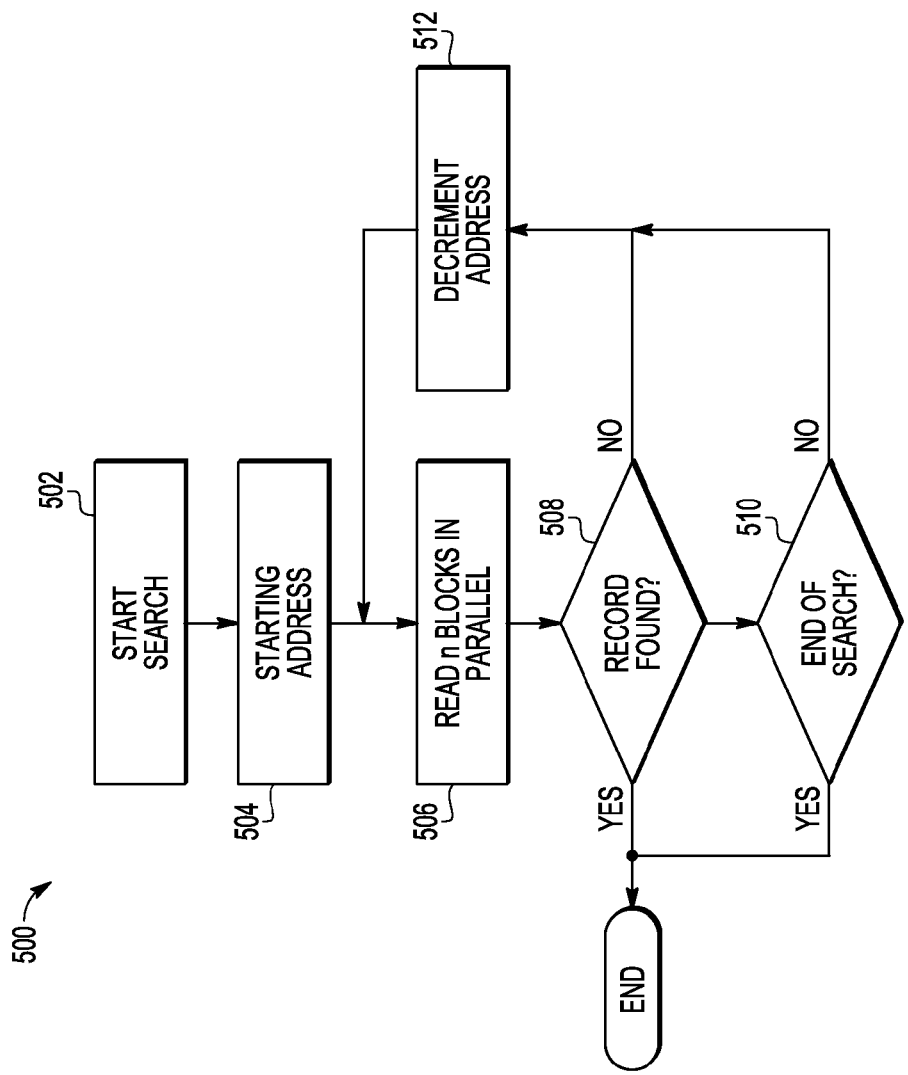
FIG. 5 illustrates a flow diagram of an embodiment of a search operation that can be performed in the system of FIG. 1.

FIG. 5 illustrates a flow diagram of an embodiment of a search operation 500 that can be performed in system 100 of FIG. 1. In process 502, the search operation is started during which record(s) in one more blocks in the flash memory array are searched for valid data. On an initial pass, process 504 includes determining the address of the record where the search will begin. The address can be the same for each block involved in a particular search. The blocks can be searched starting with the data most recently added to the block.

Process 506 includes reading the same record in n-number of blocks in parallel, where n is the number of blocks that contain data to be searched. Process 508 determines whether the desired, valid data is included in the records being searched. If the record is not found, process 510 determines whether all of the records in the block have been searched. If all of the records have not been searched, process 512 decrements the address and transitions to process 506. Processes 506-512 are repeated until the record is found in process 508 or the search ends in process 510. When the record is found in process 508, the data corresponding to the record being searched can be processed in memory controller 110 (FIG. 1).

By now it should be appreciated that there has been provided embodiments of systems and methods that reduce the copy down and search times by enabling multiple records to be read in parallel and compared.

In some embodiments, a method of transferring data from a non-volatile memory (NVM) 112 of an emulated electrically erasable (EEE) memory 104 to a random access memory (RAM) 108 of the EEE, comprises providing first data signals in parallel from the NVM. Each data signal of the first data signals is representative of a record in a block and each record is in a different block. The method can further include determining if any of the data signals of the first data signals are valid and thereby considered valid data signals. If there are more than one first data signals that are valid data signals, then a hold is placed on providing second data signals representative of records in the blocks. The valid data signals are sequentially loaded into the RAM, and the hold is removed. If only one first data signal is a valid data signal, the one valid data signal is loaded into the RAM and the second data signals are provided from the blocks. If none of the first data signals are a valid data signal, the second data signals are provided from the blocks without loading any of the first data signals into the RAM.

In another aspect, the method can continue until all of the valid data signals of the NVM are loaded into the RAM.

In another aspect, the NVM is a flash memory in which each block can have a plurality of sectors, wherein each data location within a sector is erased simultaneously.

In another aspect, the method can further comprise erasing a first sector of each of the blocks simultaneously.

In another aspect, the providing the first data signals can be in response to a first address.

In another aspect, the providing the second data signals can be in response to a second address.

In another aspect, the second address can be generated by incrementing the first address.

In another embodiment, a method of searching for a desired record in a non-volatile memory (NVM) of an emulated electrically erasable (EEE) memory and storing a data signal corresponding to the desired record to a random access memory (RAM) of the EEE, can comprise accessing a record from each block of a plurality of blocks of the NVM thereby accessing a first plurality of records, and determining if the first plurality of records includes the desired record. If the first plurality contains the desired record, the data signal corresponding to the desired record can be stored in the RAM. If the first plurality does not contain the desired record, additional pluralities of records can be accessed sequentially until the desired record is found. Upon finding the desired record, the data signal corresponding to the desired record can be stored in the RAM.

In another aspect, the accessing a record can be further characterized by the record corresponding to a first address.

In another aspect, the sequentially accessing can comprise decrementing the first address.

In another aspect, each block can comprise a plurality of sectors, wherein records within a sector are erased simultaneously.

In another aspect, the method can further comprise erasing a sector from each block simultaneously while retaining data in the sectors not being erased.

In still another embodiment, an emulated electrically erasable (EEE) memory, comprises a non-volatile memory (NVM) having a plurality of blocks, wherein each block has a plurality of sectors, and each sector has a plurality of records. The EEE memory can further comprise a random access memory (RAM), and a memory controller, coupled to the RAM and NVM, that simultaneously accesses a record from each block of the NVM to obtain accessed records, and determines which, if any, accessed records are valid. If only one accessed record is valid, a data signal corresponding to the one accessed record can be loaded into the RAM and the memory controller can continue with another simultaneous access. If none of the accessed records are valid, the memory controller can initiate another simultaneous access without loading a data signal in the RAM. If more than one of the accessed records are valid, the memory controller can postpone a next simultaneous access, load data signals corresponding to the accessed records that are valid into the RAM, and initiate the next simultaneous access.

In another aspect, the memory controller can continue accesses and determinations until all of the data signals corresponding to valid records are loaded into the RAM.

In another aspect, the NVM can be a flash memory in which each block has a plurality of sectors, wherein each data location within a sector is erased simultaneously.

In another aspect, the memory controller can be further characterized as erasing a first sector of each of the blocks simultaneously.

In another aspect, the accessing can be achieved with addressing.

In another aspect, the addressing can be achieved by incrementing an initial address.

In another aspect, the memory controller can be further characterized by searching for a desired record by accessing a plurality of records simultaneously, wherein the plurality of records includes a record from each block.

In another aspect, the searching can include determining if any of the accessed records are the desired record and stopping when one of the accessed record is the desired record.

In some embodiments, a flash memory is used as the NVM. In one example, and as used herein, programming refers to storing a logic level zero to a bitcell and erasing refers to storing a logic level one to a bitcell. However, in alternate embodiments, programming may refer to storing a logic level one to a bitcell and erasing may refer to storing a logic level zero to a bitcell. A logic level zero may also be referred to as a logic low and a logic level one may also be referred to as a logic high.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

What is claimed is:

1. A method of transferring data from a non-volatile memory (NVM) of an emulated electrically erasable (EEE) memory to a random access memory (RAM) of the EEE, comprising:

providing first data signals in parallel from the NVM, wherein in each data signal of the first data signals is representative of a record in a block and each record is in a different block;

determining if any of the data signals of the first data signals are valid and thereby considered valid data signals;

if there are more than one first data signals that are valid data signals, continue by:
  placing a hold on providing second data signals representative of records in the blocks;
  sequentially loading the valid data signals into the RAM; and
  removing the hold;

if only one first data signal is a valid data signal, continue by:
  loading the one valid data signal into the RAM; and
  providing the second data signals from the blocks;

if none of the first data signals are a valid data signal, continue by:
  providing the second data signals from the blocks without loading any of the first data signals into the RAM.

2. The method of claim 1, wherein the method continues until all of the valid data signals of the NVM are loaded into the RAM.

3. The method of claim 1, wherein the NVM is a flash memory in which each block has a plurality of sectors, wherein each data location within a sector is erased simultaneously.

4. The method of claim 3, further comprising erasing a first sector of each of the blocks simultaneously.

5. The method of claim 4, wherein the providing the second data signals is in response to a second address.

6. The method of claim 1, wherein the providing the first data signals is in response to a first address.

7. The method of claim 6, wherein the second address is generated by incrementing the first address.

8. The method of claim 1 further comprising:
accessing a record from each block of a plurality of the blocks of the NVM thereby accessing a first plurality of records;
determining if the first plurality of records includes the desired record;
if the first plurality contains the desired record, storing the data signal corresponding to the desired record in the RAM; and
if the first plurality does not contain the desired record, sequentially accessing additional pluralities of records until the desired record is found and upon finding the desired record, storing the data signal corresponding to the desired record in the RAM.

9. The method of claim 8, wherein the accessing a record is further characterized by the record corresponding to a first address.

10. The method of claim 9, wherein the sequentially accessing comprises decrementing the first address.

11. The method of claim 10, wherein each block comprises a plurality of sectors, wherein records within a sector are erased simultaneously.

12. The method of claim 11, further comprising erasing a sector from each block simultaneously while retaining data in the sectors not being erased.

13. An emulated electrically erasable (EEE) memory, comprising:
a non-volatile memory (NVM) having a plurality of blocks, wherein each block has a plurality of sectors, wherein each sector has a plurality of records;

a random access memory (RAM);

a memory controller, coupled to the RAM and NVM, that:
- simultaneously accesses a record from each block of the NVM to obtain accessed records;
- determines which, if any, accessed records are valid;
- if only one accessed record is valid, loading a data signal corresponding to the one accessed record into the RAM and continues with another simultaneous access;
- if none of the accessed records are valid, initiates another simultaneous access without loading a data signal in the RAM;
- if more than one of the accessed records are valid, postpones a next simultaneous accesses, loads data signals corresponding to the accessed records that are valid into the RAM, and initiates the next simultaneous access.

14. The EEE of claim 13, wherein the memory controller continues accesses and determinations until all of the data signals corresponding to valid records are loaded into the RAM.

15. The EEE of claim 13, wherein the NVM is a flash memory in which each block has a plurality of sectors, wherein each data location within a sector is erased simultaneously.

16. The EEE of claim 15, wherein the memory controller is further characterized as erasing a first sector of each of the blocks simultaneously.

17. The EEE of claim 13, wherein the accessing is achieved with addressing.

18. The EEE of claim 17, wherein the addressing is achieved by incrementing an initial address.

19. The EEE of claim 13, the memory controller is further characterized by searching for a desired record by accessing a plurality of records simultaneously, wherein the plurality of records includes a record from each block.

20. The EEE of claim 19, wherein the searching includes determining if any of the accessed records are the desired record and stopping when one of the accessed record is the desired record.

* * * * *